US007967590B2

(12) United States Patent
Grunitz et al.

(10) Patent No.: US 7,967,590 B2
(45) Date of Patent: Jun. 28, 2011

(54) INJECTION UNIT FOR AN INJECTION MOULDING MACHINE

(75) Inventors: Otto Grunitz, Nürnberg (DE); Simon Schulz, Wipperfürth (DE)

(73) Assignee: Sumitomo (SHI) Demag Plastics Machinery GmbH, Schwaig (DE)

(*) Notice: Subject to any disclaimer, the term of this patent is extended or adjusted under 35 U.S.C. 154(b) by 166 days.

(21) Appl. No.: 12/537,637

(22) Filed: Aug. 7, 2009

(65) Prior Publication Data

US 2010/0034913 A1 Feb. 11, 2010

(30) Foreign Application Priority Data

Aug. 8, 2008 (DE) .......................... 10 2008 037 102

(51) Int. Cl.
*B29C 45/50* (2006.01)
*B29C 45/56* (2006.01)

(52) U.S. Cl. ......................... 425/149; 425/562; 425/574

(58) Field of Classification Search .................. 425/149, 425/542, 462, 562, 563, 564, 574, 589, 595; 264/328.1

See application file for complete search history.

(56) References Cited

U.S. PATENT DOCUMENTS

| 4,858,391 | A | * | 8/1989 | Nagata et al. | 451/27 |
| 5,645,868 | A | * | 7/1997 | Reinhart | 425/145 |
| 5,891,485 | A | * | 4/1999 | Emoto | 425/145 |
| 6,149,418 | A | * | 11/2000 | O'Bryan | 425/145 |
| 6,478,572 | B1 | * | 11/2002 | Schad | 425/574 |
| 6,517,336 | B1 | * | 2/2003 | Emoto et al. | 425/145 |
| 6,998,074 | B1 | * | 2/2006 | Radulescu | 264/14 |
| 7,008,202 | B2 | * | 3/2006 | Teraoka et al. | 425/4 R |
| 7,033,158 | B2 | * | 4/2006 | Becker et al. | 425/150 |
| 7,819,655 | B2 | * | 10/2010 | Schulz | 425/574 |
| 2001/0041197 | A1 | * | 11/2001 | Yoshioka | 425/149 |
| 2003/0080452 | A1 | * | 5/2003 | Bulgrin et al. | 264/40.1 |
| 2003/0185091 | A1 | * | 10/2003 | Koike et al. | 366/92 |
| 2003/0219504 | A1 | * | 11/2003 | Harish et al. | 425/145 |
| 2004/0156939 | A1 | * | 8/2004 | Ickinger | 425/145 |
| 2005/0127546 | A1 | * | 6/2005 | Morita et al. | 264/40.1 |
| 2005/0147704 | A1 | * | 7/2005 | Ickinger et al. | 425/145 |
| 2005/0208176 | A1 | * | 9/2005 | Nishimura et al. | 425/587 |
| 2006/0292257 | A1 | * | 12/2006 | Nishimura et al. | 425/149 |
| 2007/0042068 | A1 | * | 2/2007 | Nishimura et al. | 425/149 |

FOREIGN PATENT DOCUMENTS

DE 42 06 966 A1 11/1992
DE 43 44 335 C2 6/1995

* cited by examiner

*Primary Examiner* — Yogendra N Gupta
*Assistant Examiner* — Emmanuel S Luk
(74) *Attorney, Agent, or Firm* — Henry M. Feiereisen; Ursula B. Day

(57) ABSTRACT

An injection unit for an injection molding machine includes a screw cylinder, a plasticizing screw which can be driven therein axially and rotatably, the drive unit of which has an electric drive motor, a spindle drive coupled to the screw for the axial movement of the screw, and a rotary drive arranged coaxially with the spindle drive and allowing an axial displacement of the screw for the rotational movement of the screw. A differential gearing, is arranged between the drive motor, on the one hand, and spindle drive and rotary drive, on the other hand, with a differential cage, two driven gears and at least one compensating gear in between.

10 Claims, 3 Drawing Sheets

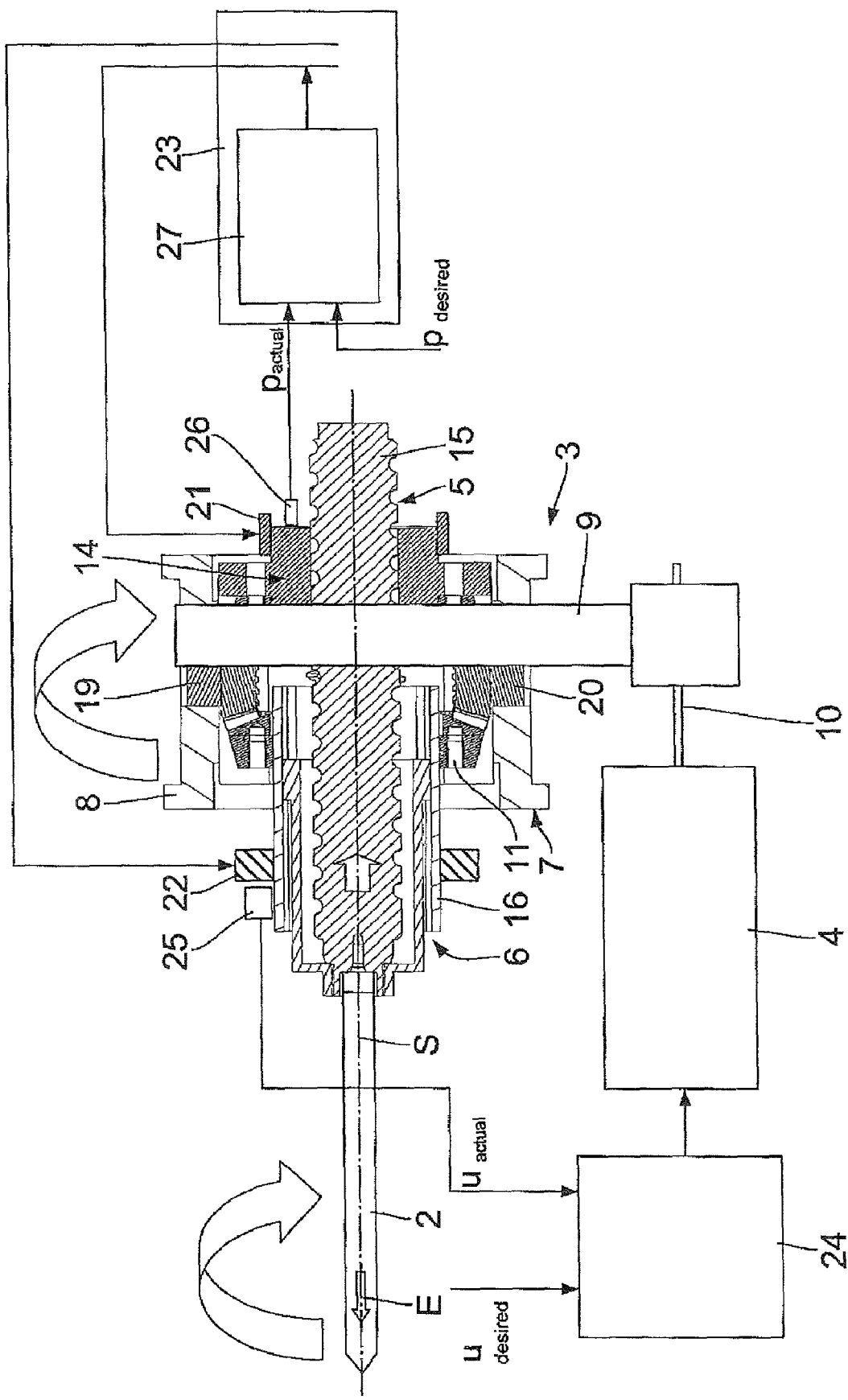

INJECTION UNIT FOR AN INJECTION MOULDING MACHINE

CROSS-REFERENCES TO RELATED APPLICATIONS

This application claims the priority of German Patent Application, Serial No. 10 2008 037 102.5, filed Aug. 8, 2008, pursuant to 35 U.S.C. 119(a)-(d), the content of which is incorporated herein by reference in its entirety as if fully set forth herein.

FIELD OF THE INVENTION

The invention relates to an injection unit for an injection moulding machine with a screw cylinder, a plasticizing screw which can be driven therein axially and rotatably, the drive unit of which has an electric drive motor, a spindle drive coupled to the screw for the axial movement of the screw, and a rotary drive arranged coaxially with the spindle drive and allowing an axial displacement of the screw for the rotational movement of the screw.

BACKGROUND OF THE INVENTION

An injection unit of this type is known, for example, from DE 43 44 335 C2 or DE 42 06 966 A1.

The document mentioned first discloses an injection assembly for an injection moulding machine, in which the plasticizing screw, which is axially and rotatably displaceable in the screw cylinder, is driven by a drive unit, which is based on a two-motor solution. Two hollow shaft motors arranged coaxially one behind the other are provided, one of which acts on the spindle nut of a spindle drive for the axial movement of the screw. The other hollow shaft motor sits on the hub of a spline shaft arrangement, the spline shaft of which is non-rotatably, but axially displaceably connected to the spindle of the spindle drive of the screw. Thus, the plasticizing screw can be made to rotate. If the two motors operate at the same rotational speed and in the same rotational direction, the screw merely carries out a rotational movement but in the case of rotational speed differences between the two drives, for example if the rotary drive is at a standstill and the spindle motor is activated, the screw is merely displaced axially, for example, for the injection movement.

The drawback in two-motor systems of this type is the fact that, apart from the actual motors, a frequency converter is also provided in each case for the rotational speed and torque regulation for each motor. Furthermore, the motors and the associated frequency converters have to be designed for the necessary maximum power taking into account the so-called ED factor (average operating period per hour). A combination of the power of two motors if the power thereof is not required, is not possible to realise a function of the injection unit.

One approach for circumventing the above problems is a so-called "one-motor solution" as shown in the published application DE 42 06 966 A1 mentioned second. A single drive motor is connected there by means of a belt drive to a spline shaft, which is non-rotatably but axially displaceably coupled to a spindle drive. The individual screw functions are controlled by means of a controllable coupling between the rotatably mounted spindle nut and the housing of the injection unit. With an engaging coupling, the spindle nut is blocked with respect to its rotatability, so that when the drive is rotating, an axial displacement of the screw takes place with simultaneous rotational movement. When the coupling is not engaged, the spindle nut rotates together with the spindle, so that only a rotational movement, but no axial movement of the screw takes place.

This known injection unit does have a compact drive unit with only one motor and correspondingly only one frequency converter but the fact is disadvantageous that the axial and rotational movement of the screw cannot be decoupled. This may be acceptable for the purpose of use specifically provided in DE 42 06 966 A1 for use in packaging machines but not for injection units of technically demanding injection moulding machines, with which high production outputs and workpiece qualities are to be achieved.

SUMMARY OF THE INVENTION

The invention is based on the object of providing an injection unit for an injection moulding machine, which, based on a one-motor solution with structurally simple means, allows completely free activatability of the individual screw functions, independently of one another.

This object is achieved by the invention based on the use of a differential gearing which is arranged between the drive motor, on the one hand, and spindle drive and rotary drive on the other hand, and which, in a known mode of construction, has a differential cage, two driven gears and at least one compensating gear in between. In this case the drive motor is drive-coupled to the differential cage,
one driven gear of the differential gearing is output-coupled to the spindle nut of the spindle drive,
the other driven gear of the differential gearing is output-coupled to the rotary drive of the screw,
the driven gears or the downstream spindle nut and rotary drive can be loaded by a respective controllable spindle and rotary brake, and
the functional movements of the screw can be controlled by a matched intervention of the spindle brake on the spindle nut and rotary brake on the rotary drive.

The solution according to the invention has the advantage owing to the use of only one motor and correspondingly only one frequency converter that the injection unit is substantially smaller and more compact. Thus, substantial weight and cost reductions can be achieved. The spindle and rotary brakes necessary for the functional control are significantly simpler with regard to their structural outlay and their activation than the installation of a second motor. To this extent, the entire drive is so compact that it can easily be encapsulated. Therefore, the spindle system is easier to lubricate. If a forced circulation of the lubricant is provided, the injection unit can be operated independently of position.

As a result of the small number of components and, accordingly, the small construction volumes, the necessary auxiliary devices can be assembled directly on the injection unit. In the prior art, these are generally accommodated in switch cabinets. The injection unit can therefore be used on an injection moulding machine as the main or additional injection unit. As a "stand alone" unit, it can be used on a broad basis in the plastics-processing industry, also, in particular, in recently opened up fields, such as in the so-called "round table rotors".

Further features, details and advantages of the invention can be inferred from the following description, in which an embodiment of the subject of the invention is described in more detail with the aid of the accompanying drawings.

BRIEF DESCRIPTION OF THE DRAWINGS

FIG. 3 shows an overview of the injection unit.

DESCRIPTION OF THE PREFERRED EMBODIMENT

Figure 1:
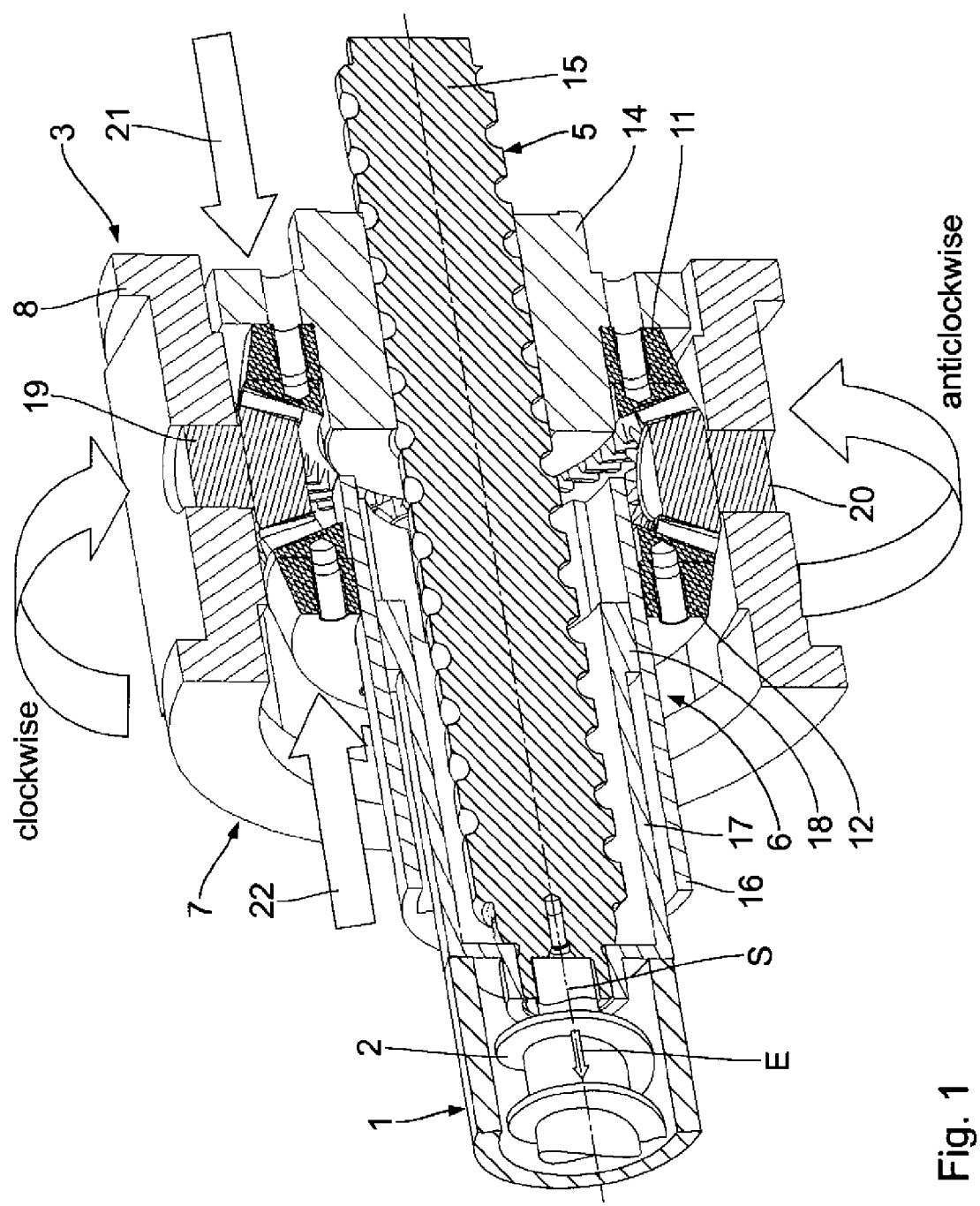
FIG. 1 shows a, cutout-wise, axially cut and broken away perspective view of an injection unit.
Figure 2:
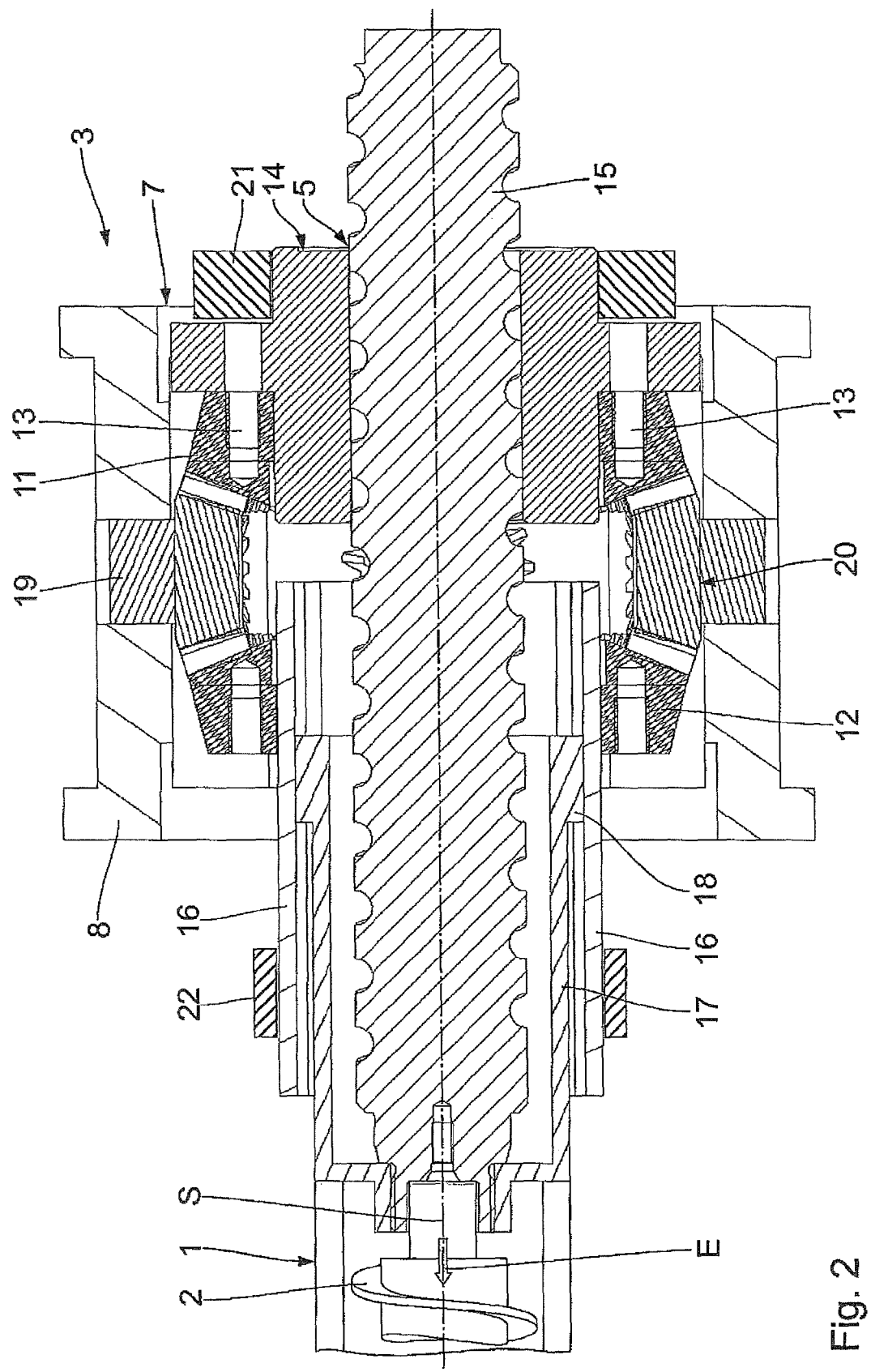
FIG. 2 shows an axial section of the injection unit analogous to FIG. 1.

As can be inferred from the drawings in their totality, the injection unit for an injection moulding machine has a screw cylinder 1, in which a conventional plasticizing screw 2 is axially and rotatably driveably mounted. The rotational movement is required, in particular for the melting of the thermoplastic injection moulding material and the transportation thereof into the screw pre-chamber before the injection nozzle. The axial movement of the plasticizing screw is used as an injection stroke, for the screw return thereafter and optionally, with a superimposed rotational movement, to keep the impact pressure constant when metering by moving back the screw.

In order to bring about this movement plan, a drive unit designated as a whole by 3 is provided, which, on the one hand, has an electric drive motor 4 and, on the other hand, a drive assembly comprised of a spindle drive 5 coupled to the plasticizing screw 2 and a rotary drive 6 arranged coaxially with the spindle drive and axially offset with respect thereto for the rotational movement of the screw.

The drive power of the electric motor 4 is transmitted by means of a differential gearing designated as a whole by 7, in which both the spindle drive and the rotary drive 6 are housed. On the drive side, the differential gearing, in a usual manner of functioning, has a differential cage 8, which acts on its outside as a belt pulley and is coupled by a belt drive 9, for example in the form of a toothed belt, in terms of drive, to the output shaft 10 of the motor 4.

In a further implementation of the functioning principle of a differential gearing, two driven gears 11, 12 are rotatably mounted in the differential cage 8 coaxially to the injection axis S of the plasticizing screw 2 and are designed as bevel gears of equal size with mutually facing bevel gear teeth. One driven gear 11 is axially fastened on the spindle nut 14 of the spindle drive 5 configured as a recirculating ball drive by means of bolts 13 extending parallel to the injection axis. The spindle 15 is seated coaxially with respect to this spindle nut 14.

The second driven gear 12 is seated on a hub 16, which is configured as a hollow shaft, the rotational axis of which also lies coaxially with respect to the injection axis S. A sleeve-like spline shaft 17 is non-rotatably but axially displaceably mounted with respect to the hub 16 in the hub 16 with the aid of projections 18, which engage in corresponding grooves formed parallel to the injection axis S into the inside of the hub 16. At the front end of the spline shaft 17, the latter, together with the spindle 15, is rigidly connected to the screw 2.

To complete the differential gearing 7, on the end face between the two driven gears 11, 12, diametrically opposing, two compensating gears 19, 20 are rotatably mounted in the differential cage 8 about a rotational axis extending at right angles to the injection axis S. The two compensating gears 19, 20 engage on either side in the spur gearing of the driven gears 11, 12.

Before the special functions of the drive unit 3 are dealt with in conjunction with the injection unit, the action principle of the differential gearing 7 in general will be briefly described. Thus, a torque introduced via the differential cage 8 is uniformly distributed to the two driven gears 11, 12 if there is no blocking at either of the two driven gears. This means that the two driven gears 11, 12 rotate at the rotational speed of the differential cage 8 and the two compensating gears 19, 20 are stationary. As soon as a blocking occurs at one of the driven gears 11, 12 and thus deceleration takes place, the opposing driven gear is driven by the compensating gears 19, 20 at a higher rotational speed compared to the differential cage 8. When one driven gear (for example 11) is stationary, the other driven gear (for example 12) rotates at a rotational speed which is higher by the factor of the transmission ratio of the differential gearing 7 in relation to the rotational speed of the differential cage 8.

The above functional behaviour of a differential gearing 7 is used by the invention for the control of the functions of the plasticizing screw 2, in that a spindle brake 21 is provided for the spindle nut 14 and a rotary brake 22 is provided for the hub 16 with the spline shaft 17. These two brakes 21, 22 can be brought into engagement, matched to one another, with the rotary drive 6 or the spindle nut 14 by a corresponding control unit 23, and this will be described in more detail below in the function description.

From a device point of view, it remains to be added that the electric motor 4 is activated with a frequency converter 24, by means of which the motor is to be regulated with respect to its rotational speed and rotational direction. For the rotational speed regulation, a rotational speed sensor 25 may be arranged in the region of the rotary drive 6 to produce a rotational speed signal $u_{actual}$, which is supplied to the frequency converter 24. By comparison with a desired value $u_{desired}$ to be input of the rotational speed, the frequency converter 24 can then ensure a corresponding regulation of the motor 4.

An impact pressure sensor 26 is arranged on the side of the spindle nut 14 and detects the impact pressure prevailing from the plasticizing screw 2 during metering counter to the injection direction E and supplies it to an impact pressure regulator 27 in the control unit in the form of a signal $p_{actual}$. By comparison with a desired impact pressure value $p_{desired}$ to be input, the impact pressure can be kept constant in a manner still to be described in more detail during the metering in the screw cylinder 1.

The manner of functioning of the drive unit 3 will be described in more detail below in association with the individual operating states of the plasticizing screw 2:

Screw rotation without axial displacement (so-called "intrusion without axial screw movement"):

The drive motor, as indicated in FIG. 1, is put into operation in such a way that the differential cage 8 is rotated anticlockwise. At the same time, the spindle brake 21 and rotary brake 22 are deactivated, in other words they are free. As a result, the spindle 15 and therefore the plasticizing screw 2 are made to rotate by means of the spline shaft 17 at the rotational speed of the differential cage 8 and, at the same time, the spindle nut 14 also rotates at the same rotational speed because of the released spindle brake 21. This means that no rotational speed difference prevails between the spindle nut 14 and spindle 15, so the spindle drive 5 is inactive. The spindle 15 and therefore the plasticizing screw 2 are not axially moved.

Owing to the screw rotation with a constant axial position, the material to be plasticized in the screw cylinder 1 is prepared with a maximum impact pressure and introduced into the screw pre-chamber.

Injection:

The drive motor 4 is controlled in such a way that the differential cage 8 is driven clockwise according to FIG. 1. At the same time, the rotary brake 22 is blocked and the spindle brake 21 remains free. Thus, the spline shaft 17 and consequently the spindle 15 non-rotatably connected thereto and plasticizing screw 2 are blocked in the rotational direction, so no further rotation of the screw 2 takes place. By means of the differential gearing 7, the rotation of the differential cage 8 is transmitted at the transmission ratio of the gearing via the compensating gears 19, 20 to the spindle nut 14, which rotates correspondingly quickly. As the spindle 15 is blocked with respect to rotation, it is accordingly axially displaced in the injection direction E together with the plasticizing screw 2. As the rotational speed of the spindle nut is high because of the transmission ratio of the differential gearing 7, an effective and rapid injection stroke of the plasticizing screw 2 takes place.

Screw return:

In order, after the injection stroke, to ensure a screw return counter to the injection direction E, the drive motor 4 is reversed by the frequency converter 24 in such a way that the differential cage 8 is made to rotate anticlockwise. At the same time, the rotary brake 22 continues to remain blocked and the spindle brake 21 remains free. The advance of the spindle 15 described during injection is therefore reversed, so the screw return can be achieved.

Metering with impact pressure regulation:

In agreement with the screw rotation without axial displacement, the drive motor 4 is activated for metering with impact pressure regulation in such a way that the differential cage 8 moves anticlockwise. The rotary brake 22 is therefore, in agreement, also free. The spindle brake 21, however, is actuated in a regulated manner, so a regulated rotational speed difference is produced between the spline shaft 17 and the spindle nut 14. The regulation takes place by means of the above-mentioned impact pressure regulator 27, which, according to FIG. 3, compares the impact pressure signal $p_{actual}$ of the impact pressure sensor 26 with a desired value $p_{desired}$ and emits a corresponding control signal to control the spindle brake 21. With an increasing impact pressure, the spindle brake 21 is increasingly actuated, so the difference in the rotational speed between the spline shaft 17 and spindle nut 14 is increased and the plasticizing screw 2 is therefore increasingly returned counter to the injection direction.

In summary, all the operating states of the plasticizing screw 2 are thus only possible with the aid of a regulated drive motor 4 and two correspondingly activatable brakes.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An injection unit for an injection moulding machine, comprising:
   a screw cylinder (1);
   a plasticizing screw (2) which can be driven therein axially and rotatably,
   the drive unit (3) of which has an electric drive motor (4),
   a drive assembly comprising a spindle drive (5) coupled to the screw (2) for the axial movement of the screw (2), and a rotary drive (6) arranged coaxially with the spindle drive (5) and allowing an axial displacement of the screw (2) for the rotational movement of the screw (2);
   a differential gearing (7), which is arranged between the drive motor (4) and the drive assembly, said differential gearing (7) having a differential cage (8), two driven gears (11, 12) and at least one compensating gear (19, 20) in between,
   wherein the drive motor (4) is drive-coupled to the differential cage (8),
   wherein one driven gear (11) of the differential gearing (7) is output-coupled to the spindle nut (14) of the spindle drive (5),
   wherein the other driven gear (12) of the differential gearing (7) is output-coupled to the rotary drive (6) of the screw (2),
   wherein the driven gears (11, 12) or the downstream spindle nut (14) and rotary drive (6) can be loaded by a respective controllable spindle brake and rotary brake (21, 22), and
   wherein the functional movements of the screw (2) can be controlled by a matched intervention of the spindle brake (21) on the spindle nut (14) and rotary brake (22) on the rotary drive (6).

2. An injection unit according to claim 1, wherein the rotary drive (6) of the screw (2) has a spline shaft (17) extending coaxially thereto, on the hub (16) of which, which is axially displaceable relative thereto, is seated the associated driven gear (12) of the differential gearing (7).

3. An injection unit according to claim 1, wherein the driven gear (11) associated with the spindle nut (14) is seated coaxially on the spindle nut (14).

4. An injection unit according to claim 1, wherein a rotational speed regulation and rotational direction control are provided for the electric drive motor (4) of the drive unit (3).

5. An injection unit according to claim 4, comprising a frequency converter (24) associated with the electric drive motor (4) for the rotational speed regulation and rotational direction control.

6. An injection unit according to claim 1, wherein the differential cage (8) can be driven directly by the drive motor configured as a hollow shaft motor.

7. An injection unit according to claim 1, wherein the differential cage (8) can be driven indirectly by the drive motor (4) by means of a gearing coupling.

8. An injection unit according to claim 7, wherein the gearing coupling is a belt drive (9).

9. An injection unit according to claim 1, wherein during screw rotation without axial displacement (intrusion without axial screw displacement) the drive motor (4) rotates anticlockwise, the spindle brake (21) is free, and the rotary brake (22) is free, wherein during injection the drive motor (4) rotates clockwise, the spindle brake (21) is free, and the rotary brake (22) is blocked, wherein during screw return the drive motor (4) rotates anticlockwise, the spindle brake (21) is free, and the rotary brake (22) is blocked, and wherein during metering with impact pressure regulation the drive motor (4) rotates anticlockwise, the spindle brake (21) is regulated, and the rotary brake (22) is free.

10. An injection unit according to claim 9, comprising a regulating device for the impact pressure prevailing in the function "metering with impact pressure regulation" on the screw (2), comprising
   an impact pressure sensor (26), an impact pressure regulator (27) coupled therewith, into which a desired impact pressure value ($p_{desired}$) and the measured impact pressure can be input as the actual value ($p_{actual}$), wherein the braking intervention of the spindle brake (21) and therefore the relative speed of the rotary drive (6) and spindle drive (5) can be regulated by means of a control signal generated by the impact pressure regulator (27) in such a way that the screw (2) under constant impact pressure ($p_{desired}$) can be moved back in a controlled manner counter to the injection direction.

* * * * *